(12) United States Patent
Beer et al.

(10) Patent No.: US 8,496,812 B2
(45) Date of Patent: Jul. 30, 2013

(54) OIL SUMP HAVING OIL FILTER ON CARRIER UNIT

(75) Inventors: Markus Beer, Morsbach (DE); Dietmar Sahm, Reichshof (DE); Wolfgang Stausberg, Morsbach (DE); Andreas Piehlk, Freudenberg (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 492 days.

(21) Appl. No.: 12/541,009

(22) Filed: Aug. 13, 2009

(65) Prior Publication Data

US 2010/0038296 A1 Feb. 18, 2010

(30) Foreign Application Priority Data

Aug. 13, 2008 (DE) .............................. 10 2008 038 958

(51) Int. Cl.
*F01M 11/03* (2006.01)
(52) U.S. Cl.
USPC ................... 210/167.03; 210/172.3; 210/232; 210/167.08
(58) Field of Classification Search
None
See application file for complete search history.

(56) References Cited

U.S. PATENT DOCUMENTS

| | | | | |
|---|---|---|---|---|
| 1,868,055 A * | 7/1932 | Edwards | ...................... | 184/6.24 |
| 1,874,585 A * | 8/1932 | Newcomb | ..................... | 184/106 |
| 3,211,256 A * | 10/1965 | Teutsch | ......................... | 184/106 |
| 3,211,291 A * | 10/1965 | Teutsch | ...................... | 210/172.3 |
| 3,784,011 A * | 1/1974 | Ward | ........................ | 210/167.03 |
| 4,136,011 A * | 1/1979 | Joseph et al. | ............ | 210/167.08 |
| 4,264,443 A * | 4/1981 | Anderson et al. | ........ | 210/167.08 |
| 6,013,179 A | 1/2000 | Laughlin et al. | | |
| 6,539,912 B1 * | 4/2003 | Beer | ........................ | 123/196 R |
| 6,585,889 B2 * | 7/2003 | Weingaertner | ............. | 210/172.2 |
| 6,648,146 B2 * | 11/2003 | Beer et al. | ..................... | 210/405 |
| 6,715,459 B2 * | 4/2004 | Rosendahl et al. | ........ | 123/195 C |
| 6,808,575 B2 * | 10/2004 | Mauelshagen et al. | ...... | 156/73.5 |
| 7,087,160 B2 * | 8/2006 | Beer et al. | ................ | 210/167.02 |
| 7,128,218 B2 * | 10/2006 | Rosendahl et al. | ........... | 210/455 |
| 7,217,357 B2 * | 5/2007 | Rosendahl et al. | ........... | 210/130 |
| 7,383,809 B2 * | 6/2008 | Rosendahl et al. | ....... | 123/198 E |
| 7,845,500 B2 * | 12/2010 | Hueppchen et al. | .......... | 210/455 |
| 8,038,877 B2 * | 10/2011 | Stausberg et al. | ........ | 210/167.08 |
| 8,137,546 B2 * | 3/2012 | Ogose | ........................ | 210/172.4 |
| 8,173,013 B2 * | 5/2012 | Sato et al. | .................. | 210/172.4 |

(Continued)

FOREIGN PATENT DOCUMENTS

| | | |
|---|---|---|
| DE | 1176924 | 4/1965 |
| DE | 4242513 A1 | 6/1994 |

(Continued)

*Primary Examiner* — Robert James Popovics
(74) *Attorney, Agent, or Firm* — Loza & Loza, LLP; Leo J. Jennings

(57) ABSTRACT

An oil sump, preferably made of plastic or metal, is provided for engines or transmissions, the oil sump comprising a filter housing including a filter housing top shell, a filter housing bottom shell, a filter medium, a filter inlet, and the filter outlet, and having an oil drain opening in a floor area of the oil sump, implemented in such a way that it is closable using an oil drain screw having external thread, which comes from the oil sump outer side. The oil sump also includes a carrier unit having a frame, on which the filter housing is fastened and which is used as a seal upon fastening of the oil sump on the associated unit, in particular on an engine block or a transmission unit.

9 Claims, 3 Drawing Sheets

U.S. PATENT DOCUMENTS

| | | | |
|---|---|---|---|
| 8,246,819 B2* | 8/2012 | Sakata et al. | 210/167.08 |
| 8,372,278 B1* | 2/2013 | Nguyen et al. | 210/172.2 |
| 2001/0047996 A1* | 12/2001 | Weingaertner | 220/571 |
| 2003/0132147 A1* | 7/2003 | Rosendahl et al. | 210/130 |
| 2003/0132157 A1* | 7/2003 | Beer et al. | 210/435 |
| 2003/0140887 A1* | 7/2003 | Rosendahl et al. | 123/195 C |
| 2004/0007520 A1* | 1/2004 | Rosendahl et al. | 210/435 |
| 2004/0129368 A1* | 7/2004 | Mauelshagen et al. | 156/73.6 |
| 2006/0180541 A1* | 8/2006 | Hueppchen et al. | 210/450 |
| 2007/0017745 A1* | 1/2007 | Rosendahl et al. | 184/6.24 |
| 2007/0023337 A1* | 2/2007 | Peet et al. | 210/136 |
| 2007/0151906 A1* | 7/2007 | Beer et al. | 210/130 |
| 2008/0290013 A1* | 11/2008 | Stausberg et al. | 210/167.04 |
| 2009/0139922 A1* | 6/2009 | Poskie et al. | 210/167.08 |
| 2009/0301954 A1* | 12/2009 | Beer et al. | 210/167.08 |
| 2010/0038296 A1* | 2/2010 | Beer et al. | 210/167.03 |

FOREIGN PATENT DOCUMENTS

| | | |
|---|---|---|
| DE | 19735445 A1 | 1/1999 |
| DE | 10008692 A1 | 9/2001 |
| DE | 102005025726 A1 | 12/2006 |
| EP | 0 811 761 A | 12/1997 |
| EP | 0811761 A1 | 12/1997 |
| EP | 0924396 A1 | 6/1999 |
| EP | 1339954 B1 | 1/2001 |
| EP | 1333160 A1 | 1/2002 |
| EP | 1 253 299 A | 10/2002 |
| EP | 1253299 A2 | 10/2002 |
| JP | S5425943 U | 2/1979 |
| JP | 59046312 A | 3/1984 |
| JP | 06299902 A | 10/1994 |
| JP | 2002364325 A | 12/2002 |

\* cited by examiner

OIL SUMP HAVING OIL FILTER ON CARRIER UNIT

CROSS-REFERENCE TO RELATED APPLICATIONS

This application claims priority to foreign Patent Application DE 10 2008 038 958.7, filed on Aug. 13, 2008, the disclosure of which is incorporated herein by reference in its entirety.

FIELD OF THE INVENTION

The present invention relates to an oil sump. More particularly, the present invention relates to an oil sump for engines or transmissions.

BACKGROUND OF THE INVENTION

Oil sumps known from the prior art, preferably made of metal or plastic, typically have a separate filter placed in direct proximity to the oil sump floor, comprising at least one oil filter medium and one oil filter housing, which is preferably implemented as a suction oil filter. Oil sumps of this type having such an oil filter are known. It is problematic in the filters disclosed above that complex fastening and/or fixing of the components with one another is necessary because of the separation of the components, such as the oil sump and the oil filter in particular. A connection of these components is performed according to the prior art, for example, by riveting, etc. Furthermore, oil filters placed separately in an oil sump have a gap between the filter bottom side and the inner side of the oil sump, which results in uncontrolled air suction and the development of noises due to movement of the loose filter in the oil sump. This results in a decrease of the filter efficiency and a reduction of the usage comfort.

According to another approach of the prior art, the filter is fastened permanently and no longer removably in the oil sump, for example, by welding and/or gluing. These embodiments have the disadvantage, however, that a separate replacement of the filter is not possible, and a replacement of the oil sump/oil filter unit is thus very complex and costly.

SUMMARY OF THE INVENTION

Embodiments of the present invention advantageously provide an oil sump having an oil filter, which no longer has the disadvantages described above and/or in particular to disclose an oil sump, preferably made of metal or plastic, in which the oil filter is integratable permanently, the number of the required components being reduced simultaneously, the assembly being made easier, the costs for production and installation being lowered, undesired disadvantageous technical effects being reduced, and the filter being easily replaceable as needed and thus being able to be situated so it can be separated in the oil sump.

The oil sump is preferably entirely or partially made of plastic or metal, and is suitable in particular for engines or transmissions. The oil sump comprises a filter housing and an oil drain opening in the floor area of the oil sump. The filter housing comprises a filter housing top shell, a filter housing bottom shell, a filter medium, a filter inlet, and a filter outlet. The construction of such a filter housing is fundamentally known from the prior art. The oil drain opening in the floor area of the oil sump is implemented in such a way that it is closable using an oil drain screw having external thread which comes from the oil sump outer side. The oil sump has a carrier unit having a frame, on which the filter housing is fastened and which is used as a seal upon fastening of the oil sump on the associated unit, in particular on an engine block or a transmission unit. This fastening may be performed directly or indirectly, and it may be removable or non-removable. The carrier unit may be implemented in one piece or multiple pieces. The carrier unit may be produced from a single material or from various materials, and this is also true for its various parts. Because the filter housing is fastened on the carrier unit, the filter housing may be removed together with the carrier unit from the oil sump in the event of a possible filter change. The use of the carrier unit thus makes access to the filter housing easier. The frame of the carrier unit is used as a seal upon fastening of the oil sump on the associated unit, such as an engine block or a transmission unit. This presumes that, on the one hand, the material of the frame of the carrier unit is selected accordingly, and the dimensions of the frame are adapted to the oil sump and/or its external dimensions, in particular the outer edge, so that the sealing effect may be achieved in its entirety as much as possible on the basis of the carrier unit when the oil sump is fastened on the associated unit. The integrated implementation of carrier unit having a frame, which has seal properties, and having the filter housing has the advantage that the number of required individual parts is reduced further. It is no longer necessary in particular to use a separate seal for fastening the oil sump on its associated unit. The oil sump is preferably fastened on its associated functional unit by screwing.

According to a preferred embodiment of the invention, the filter housing top shell is fastened on the frame of the carrier unit. According to another preferred embodiment, the filter housing bottom shell is fastened on the frame of the carrier unit. The fastening may be performed in each case directly or indirectly, and it may be removable or also non-removable. The fastening is performed, for example, by welding, gluing, clipping, etc.

According to a preferred embodiment of the invention, the frame of the carrier unit has holes for receiving screws, which are provided at points at which an outer edge of the oil sump also has holes, so that the oil sump may be fastened on the associated unit, in particular an engine block or a transmission unit, and the frame is used as a seal. If the carrier unit having the filter housing is inserted into an oil sump, it is immediately obvious from the position of the frame compared to the external dimensions, in particular the outer edge, of the oil sump, whether or not the carrier unit and with it the filter housing are placed directly in the oil sump. On the one hand, this is clear from the correspondence of the provided holes in carrier unit and oil sump edge, on the other hand, of course, also from a correspondence of the external dimensions of carrier unit and/or frame on one side and external dimensions of the oil sump on the other side. It is also possible to connect the oil sump with its associated unit using the carrier unit and/or its frame as a seal element in a particularly simple way.

A functional unit for whose correct functioning an oil sump is provided is understood as the associated unit in this case. In the case of an oil sump for engines, this is the engine block, in the case of an oil sump for transmissions, it is the transmission unit. Further applications may be concluded directly by one skilled in the art.

The frame of the carrier unit may have different external dimensions and/or widths according to the invention. In particular, it is possible to adapt its external shaping to each known oil sump individually and/or to pre-finish it in series.

According to a further preferred embodiment of the invention, the carrier unit has one web or multiple webs, via which the filter housing is connected to the carrier frame. The filter housing is frequently located in a central area of the oil sump and not directly adjoining a side wall of the oil sump. In order to produce a connection between the filter housing and the carrier unit and/or the frame of the carrier unit, connection elements are provided from the filter housing up to the frame of the carrier unit. These elements are preferably implemented in the form of webs. These are comparatively narrow connection elements which may be provided individually, in pairs, or in multiples. The dimensions of the webs and their numbers may be adapted to the required stability, vibration behavior, etc. of the entire oil sump unit. The filter housing is preferably connected on at least two positions to the frame of the carrier unit using one or more webs in each case. The position of these connection elements and/or webs is preferably selected so that the distance to the frame is low, on the one hand, and the connection points are preferably opposite to one another, on the other hand. This allows the greatest possible stability. The webs may form the connection between frame and filter housing freely traversing the oil sump, according to a preferred embodiment of the invention, the webs are designed so that they cling to the floor of the oil sump in the connected state. This allows an especially good and secure and, in addition, space-saving fastening.

According to a further preferred embodiment of the invention, the oil sump has a magnet on which the carrier unit is fastened or fastenable. Such a magnet is fundamentally known from the prior art and is used for collecting metal parts in the oil sump, such as small metal particles, which may occur because of wear phenomena in the functional unit associated with the oil sump. The magnet may be fastened on the carrier unit in greatly varying ways. In particular, it may be removably fastened on the carrier unit. Upon a replacement of the magnet, it may thus be easily removed together with the entire carrier unit from the oil sump and replaced as needed on the carrier unit. The magnet may, for example, be screwed down, glued on, or also simply held by magnetic forces and/or appropriate shaping, e.g., depressing the carrier unit at the point provided for the magnet, on its place in the carrier unit.

According to a further preferred embodiment of the invention, the filter housing has an internal thread, which is implemented to receive the external thread of the oil drain screw, and the filter housing being fastened on the oil sump at least partially via the oil drain screw, which closes the oil drain opening and engages using its external thread in the internal thread on the filter housing side. According to this embodiment, the oil drain screw, which is provided in the oil sump in any case, may not only be used to close the oil drain opening provided in the floor area of the oil sump, but rather at least a part of the filter housing, in particular the filter housing bottom shell and/or the filter housing top shell, may simultaneously be fastened on the oil sump via the oil drain screw. In this way, particularly efficient and cost-effective positioning of a least a part of the oil filter housing is also achieved, because an oil drain screw is already provided in standard oil sumps according to the species. The already known closure function of the oil drain screw thus also has a fastening function for fastening at least a part of the oil filter housing added to it. The sole fastening of the filter housing by the oil drain screw on the oil sump is already often sufficient, but the use of a carrier according to the invention having the filter housing allows a simple, additional, and thus still secure fixing of the filter housing in the oil sump, however, without an additional work step being necessary. The additional fastening of the filter housing on the oil sump is performed by using the frame of the carrier unit as a seal element, and such a seal element would normally have had to be provided separately in any case otherwise.

According to a further preferred embodiment of the invention, the filter housing bottom shell comprises an internal thread, which is implemented to receive the external thread of the oil drain screw. In addition to the filter housing bottom shell, the filter housing thus also has a filter housing top shell in this embodiment, which is connected in a suitable way to the filter housing bottom shell. For this purpose, further connection means, preferably removable, such as detent means, may be provided to allow a replacement of the filter medium situated inside the filter housing. Fundamentally, it is also possible in this context to provide both the filter housing bottom shell and also the filter housing top shell with a suitable internal thread, which are situated lying one above another in the installed state in the screwing-in direction of the oil drain screw, so that the oil drain screw fastens both the filter housing bottom shell and also the filter housing top shell on the oil sump.

In a further preferred embodiment of the invention, the filter housing bottom shell is formed by a floor area of the oil sump, and the filter housing top shell comprises an internal thread which is implemented to receive the external thread of the oil drain screw. In this embodiment, a separate filter housing bottom shell is thus not necessary, because this function is achieved by a subarea of the oil sump floor. The module, which is to be fastened on the oil sump and is open toward one side, thus comprises at least the filter housing top shell (and optionally also the filter medium). Correspondingly, the internal thread which is necessary to receive the external thread of the oil drain screw is situated on the filter housing top shell. In order to make the engagement of the external thread of the oil drain screw in the internal thread on the filter housing top shell side easier, it is preferably implemented in a way protruding from the inner surface of the filter housing top shell and pointing in the direction toward the oil sump floor. Especially preferably, the internal thread and/or the part of the filter housing top shell forming the internal thread protrude far enough in the direction of the oil sump floor that, in the installed state, this part of the filter housing top shell stands on the oil sump floor and/or is in contact therewith. The filter housing top shell is fastened especially well on the oil sump floor in this way.

BRIEF DESCRIPTION OF THE DRAWINGS

The invention is described further hereafter on the basis of the exemplary embodiments shown in the drawings.

DETAILED DESCRIPTION

Figure 1:
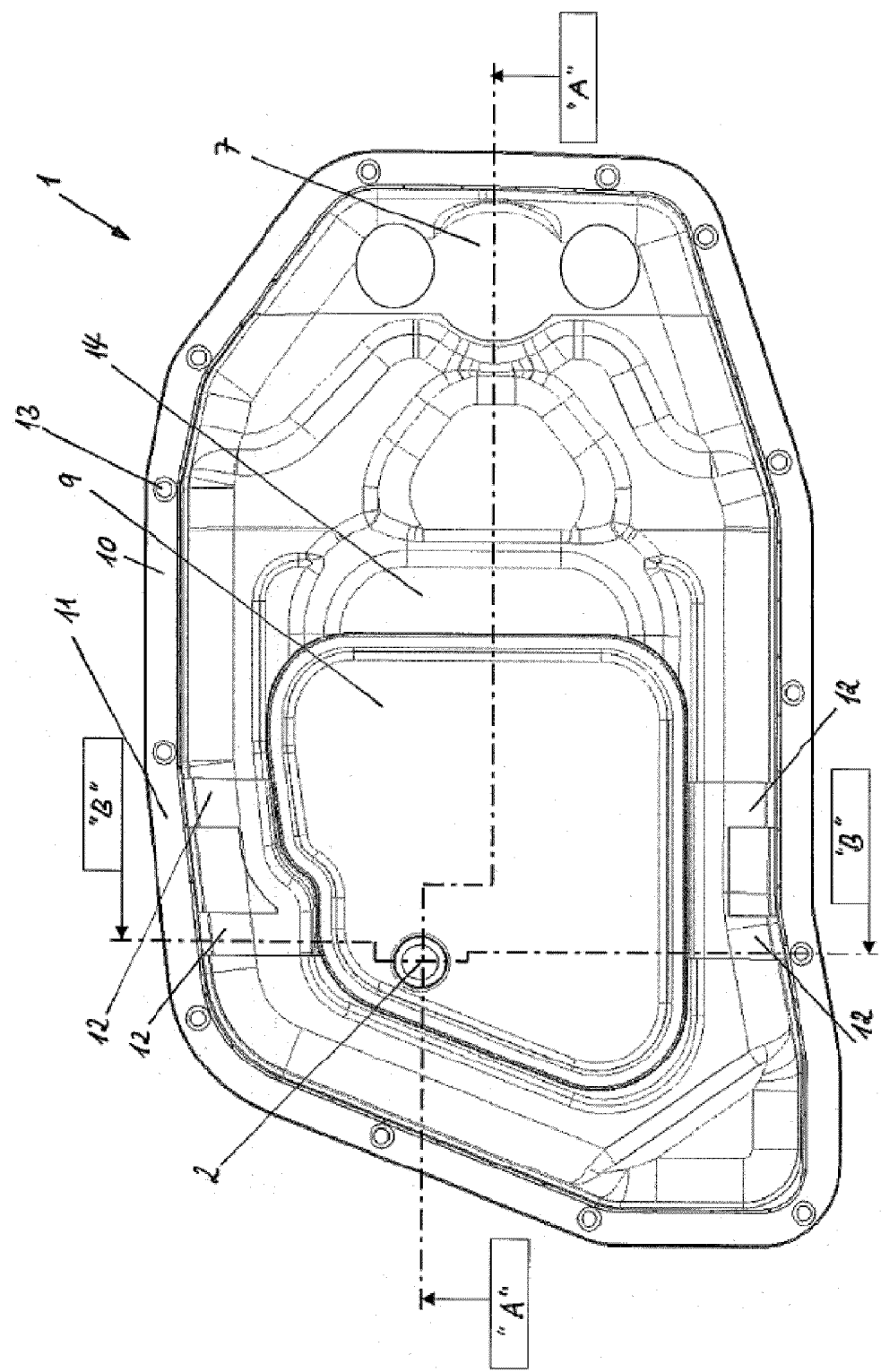
FIG. 1 shows a top view of an oil sump according to an embodiment of the present invention having a filter housing and having a carrier unit.

FIG. 1 shows a top view of an oil sump 1 according to an embodiment of the present invention made of aluminum having filter housing 9 and carrier unit 11. The fundamental components of the oil sump 1 are clearly visible in this top view. In the exemplary embodiment shown, the oil sump 1 is shaped irregularly and has multiple depressions in the floor 14 of the oil sump 1 in its central area. The filter housing 9 is located in one central area of the oil sump 1. The filter housing 9 is linked via webs 12 to a frame 10. The frame 10 forms a component of the carrier unit 11, to which the filter housing 9 is connected via the webs 12. In this way, the carrier unit 11 forms a unit with the filter housing 9, which may be inserted into the oil sump 1 in this unit and also removed from it again. The frame 10 of the carrier unit 11 is implemented as peripheral, i.e., as a completely closed frame. It corresponds in its external dimensions to the edge of the oil sump 1 located underneath it. Holes 13, which are adapted to one another in their position, are provided in both the frame 10 of the carrier unit 11 and also in the edge of the oil sump 1 located underneath it. In this way, in the event of appropriate material selection for the frame 10 of the carrier unit 11, a seal may be produced between the oil sump 1 and the unit (not shown) associated with the oil sump, when the oil sump 1 is fastened on the associated unit, in particular screwed on. For example, ethylene-acrylate rubber, which is extruded onto frame 10, is well suitable as the seal material. A magnet 7 may be seen in the right area of FIG. 1. It is also fastened on the carrier unit 11. For this purpose, the carrier unit 11 has a receptacle surface in order to receive the magnet 7 in a specific area of the frame 10.

In the exemplary embodiment shown, two web pairs 12 are provided for fastening the filter unit 9 on the carrier unit 11. The two web pairs are attached opposite to one another at different points of the filter housing 9, and the distance bridged by each of them between the filter housing 9 and the frame 10 of the carrier unit 11 is comparatively slight. It would also be conceivable, however, to provide the webs 12 at other positions and not in the form of diametrically op-posing web pairs. In the exemplary embodiment shown, the webs cling to the oil sump floor.

Figure 2:
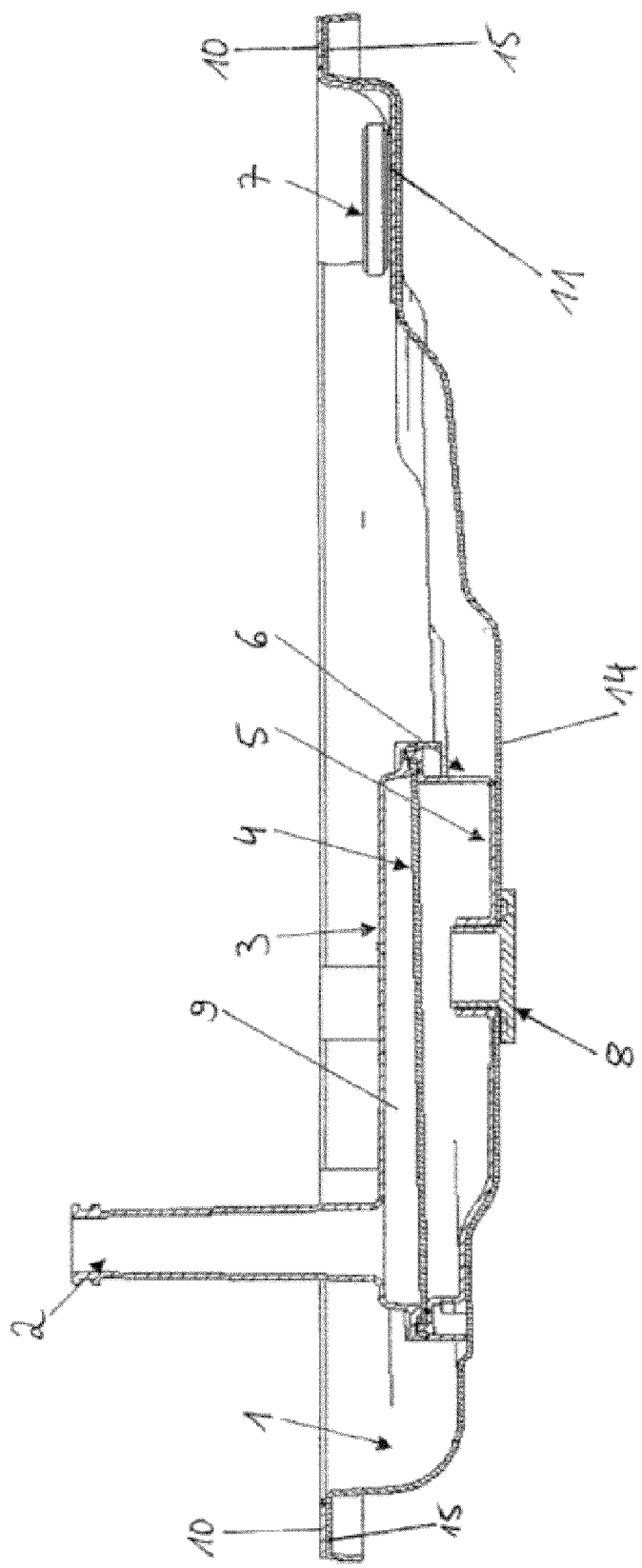
FIG. 2 shows a lateral sectional illustration through the oil sump shown in FIG. 1 along section line A.

FIG. 2 shows a lateral sectional illustration through the oil sump 1 shown in FIG. 1 along section line A. In this sectional view, the fundamental construction of the filter housing 9 is clearly visible. The filter housing 9 is composed of a top shell 3 and a filter bottom shell 5. The filter medium 4 is located between these two shells. A filter outlet 2 is provided adjoining the filter top shell 3. In the illustration shown in FIG. 2, the filter inlet 6 is located laterally to the right on the filter bottom shell 5. The filter bottom shell 5 is provided with an internal thread, in which an external thread of the oil drain screw 8 is received. In this way, it is possible to fasten the filter housing at least partially via the oil drain screw 8, which closes the oil drain opening and engages using its external thread in the internal thread on the filter housing side, on the oil sump 1. As already noted in the general part of the description of the invention, it is also possible that the filter housing 9 has a filter housing top shell, but the filter housing bottom shell is formed constructively by a floor area 14 of the oil sump 1. In this case, the filter housing top shell 3 comprises an internal thread, which is implemented to receive the external thread of the oil drain screw 8.

The filter housing 9 is connected to the carrier unit 11. In the sectional illustration along section line A shown in FIG. 2, this connection may not be seen, however, because this connection is not provided along section line A, this is only the case along section line B. Instead, an area of the frame 10 of the carrier unit 11 may be recognized on the left in FIG. 2. It is on one edge 15 of the oil sump 1. In the right area of FIG. 2, a section of the frame 10 of the carrier unit 11 may again be seen. It also lies on an edge 15 of the oil sump 1. Furthermore, starting from the area of the edge 10, the carrier unit 11 extends further to the left, i.e., into the central area of the oil sump 1. A depressed receptacle surface of the carrier unit 11 is implemented in the example shown, on which the magnet 7 is fastened. The parts which are included in FIG. 2 in the carrier unit 11 and/or are connected permanently thereto (such as the entire filter housing 9 having its parts) have the same shading in FIG. 2. Furthermore, it may be seen in FIG. 2 that the bottom shell 5 of the filter housing 9 is adapted in its shaping to the shaping of the floor 14 of the oil sump 11. This allows an especially simple and precisely fitted, and also space-saving connection of the filter housing 9 to the floor 14 of the oil sump 1.

Figure 3:
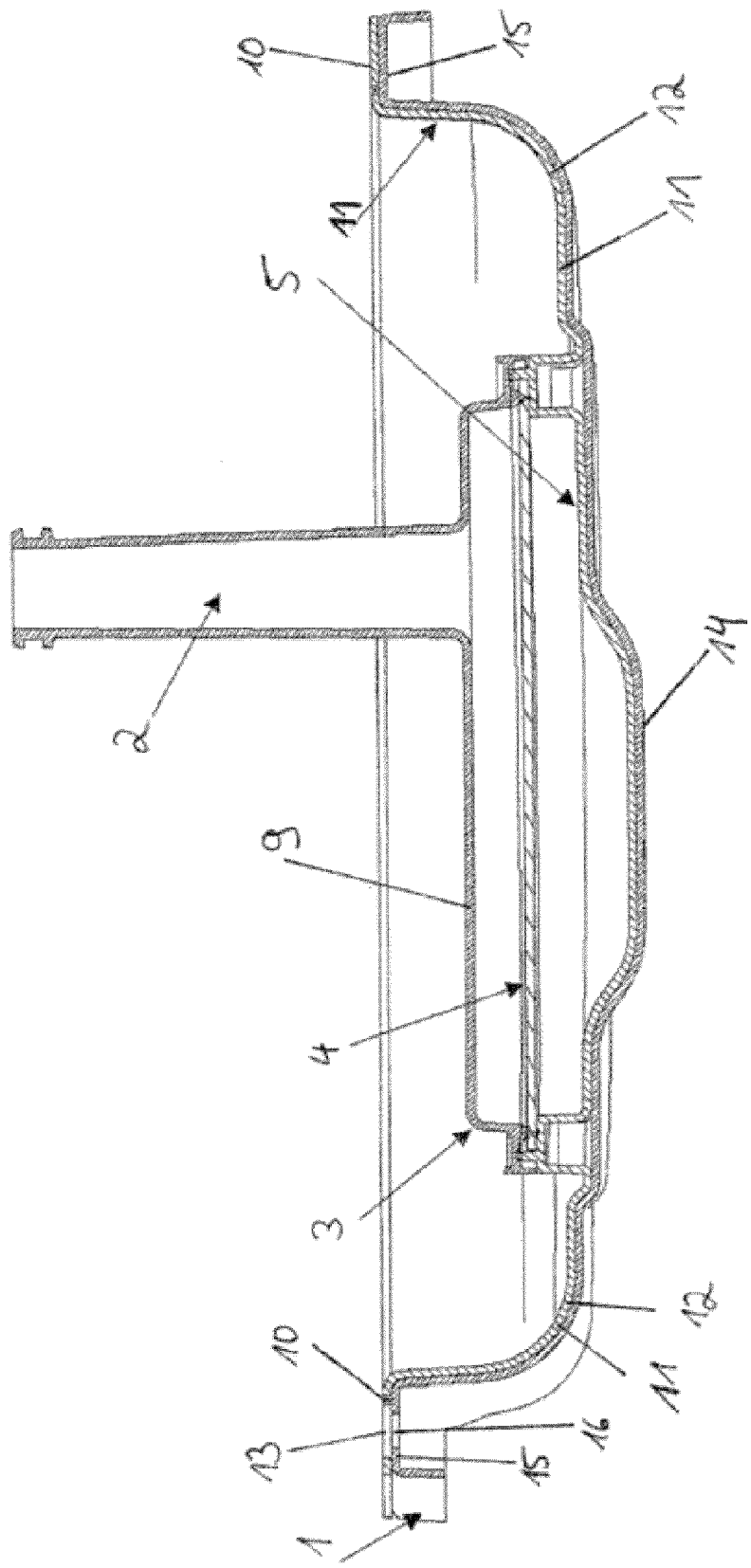
FIG. 3 shows a lateral sectional illustration through the oil sump shown in FIG. 1 along section line B.

FIG. 3 shows a lateral sectional illustration through the oil sump 1 shown in FIG. 1 along section line B. It may be seen well in this sectional illustration that a continuous connection exists between the frame 10 of the carrier unit 11 on both sides of the illustration in FIG. 3 and the filter housing 9 having its individual components. The connection occurs via webs 12 of the carrier unit 11. In the exemplary embodiment shown, the webs 12 are designed so that they press against the floor 14 of the oil sump 1 and/or cling thereon. A hole 13 through the carrier unit 11 and/or the frame 10 of the carrier unit 11 may be seen on the left in FIG. 3. This hole 13 coincides with a hole 16, which is provided on the edge 15 of the oil sump 1. In this way, the carrier unit 11 may be placed exactly in the oil sump 1, on the one hand, and a screw may be guided through the openings 13 and 16 for fastening purposes, on the other hand, in order to fasten the oil sump 1 having the filter housing 9 located therein on the functional unit associated with the oil sump 1. The edge 10 is used as a seal.

With the aid of the invention it is possible to place and fasten a filter housing 9 in the oil sump 1 in a simple way. Moreover, providing separate seals for the subsequent attachment of the oil sump 1 on an associated functional unit is superfluous, because the frame 10 of the carrier 11 automatically also ensures this function. In addition, the implementation of a carrier unit 11 on which the filter housing 9 is fastened ensures even greater stability and better handling ability of the entire device. In particular, combined with fastening of the filter housing 9 on the floor 14 of the oil sump 1 through the oil drain screw 8, which is provided in any case, highly flexible us-ability of the filter housing 9 and very secure, reversible, and simple fastening of the filter housing 9 in the oil sump 1 according to the invention result in this way.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:
1. An oil sump, comprising:
   a filter housing including a filter housing top shell, a filter housing bottom shell, a filter medium, a filter inlet, and a filter outlet;
   wherein the filter outlet is provided on the filter housing top shell, and the filter housing bottom shell has a shell floor area which is not permeable to fluid and the filter inlet is provided on the filter housing bottom shell, with the filter inlet being provided at a side region of the filter bottom shell;
   an oil sump housing including a sump floor area having an oil drain opening closable by an oil drain screw, and a periphery configured to attach the oil sump to a unit, wherein the unit comprises is at least one of an engine block and a transmission;

wherein the filter housing bottom shell floor area is adjacent to and overlies a portion of the sump floor area, with substantially no space therebetween, thereby permitting no fluid flow between the inside sump floor and the outside of the bottom shell sump floor; and a carrier unit on which the filter housing is fastened, wherein the carrier unit includes a frame extending around the periphery of the oil sump housing, and wherein the frame is configured to form a seal between the oil sump housing and the unit.

2. The oil sump according to claim 1, wherein the filter housing top shell is fastened on the frame of the carrier unit.

3. The oil sump according to claim 1, wherein the filter housing bottom shell is fastened on the frame of the carrier unit.

4. The oil sump according to claim 1, wherein the frame of the carrier unit has holes for receiving screws, which are provided at points at which the periphery of the oil sump housing has hole.

5. The oil sump according to claim 1, wherein the carrier unit has at least one web via which the filter housing is connected to the carrier frame.

6. The oil sump according to claim 1, further comprising a magnet fastenable to the carrier unit.

7. The oil sump according to claim 1, wherein the filter housing has an internal thread to receive an external thread of the oil drain screw, and wherein the filter housing is fastened, at least partially, to the oil sump housing via the oil drain screw which closes the oil drain opening and engages the internal thread on the filter housing side.

8. The oil sump according to claim 7, wherein the filter housing bottom shell includes the internal thread to receive the external thread of the oil drain screw.

9. The oil sump according to claim 1, wherein the oil sump housing is made of at least one of plastic or metal.

* * * * *